United States Patent [19]

Vanderpool

[11] Patent Number: 5,497,424
[45] Date of Patent: Mar. 5, 1996

[54] SPREAD SPECTRUM WIRELESS TELEPHONE SYSTEM

[75] Inventor: Jeffrey S. Vanderpool, Colorado Springs, Colo.

[73] Assignee: Omnipoint Data Company, Boston, Mass.

[21] Appl. No.: 192,707

[22] Filed: Feb. 7, 1994

Related U.S. Application Data

[60] Division of Ser. No. 712,239, Jun. 7, 1991, Pat. No. 5,285,469, which is a continuation-in-part of Ser. No. 709,712, Jun. 3, 1991, abandoned.

[51] Int. Cl.$^6$ .................................................. H04K 1/10
[52] U.S. Cl. ............................ 380/34; 375/200; 379/59; 379/60; 455/33.1; 455/33.2
[58] Field of Search ................................... 375/1; 380/34; 379/59, 60; 455/33.1, 33.2

[56] References Cited

U.S. PATENT DOCUMENTS

| | | | |
|---|---|---|---|
| 27,738 | 8/1873 | Honma et al. | 332/9 R |
| 3,934,203 | 1/1976 | Schiff | 325/65 |

(List continued on next page.)

FOREIGN PATENT DOCUMENTS

| | | |
|---|---|---|
| 3984485 | 9/1985 . | H04B/7/26 |
| 8700370 | 1/1987 . | H04J/13/00 |
| 0219085 | 4/1987 . | |
| 0326104 | 2/1989 . | |
| 0361299 | 4/1990 . | H04B/7/26 |
| 3126333 | 5/1991 . | H04B/7/26 |
| 9315573 | 8/1993 . | H04J/13/00 |
| 9318596 | 9/1993 . | H04J/3/16 |
| 9318601 | 9/1993 . | H04L/27/30 |
| 9406217 | 3/1994 . | H04B/7/005 |

OTHER PUBLICATIONS

Robert C. Dixon, *Spread Spectrum Systems*, John Wiley & Sons, Inc., 1984; pp. 84–86, 206, 230–232.
Ralph Eschenbach, *Applications of Spread Spectrum Radio to Indoor Data Communications*, Hewlett-Packard Laboratories, IEEE 1982, pp. 34.5-1-34.5-3.
Mohsen Kavehrad, *Direct Sequence Spread Spectrum with DPSK Modulation and Diversity for Indoor Wireless Communications*, IEEE Transactions on Communications, vol. COM-35, No. 2, Feb. 1987.

(List continued on next page.)

*Primary Examiner*—David C. Cain
*Attorney, Agent, or Firm*—Lyon & Lyon

[57] ABSTRACT

A system for accessing a telephone system, in which a set of user stations are matched with a set of base stations for connection to a telephone network. Each base station may be coupled directly or indirectly to the telephone network and may be capable of initiating or receiving calls on the telephone network. Each user station may comprise a spread-spectrum transmitter or receiver and may be capable of dynamic connection to selected base stations. A plurality of base stations may be coupled to a private exchange telephone system for coupling user stations in calls outside the telephone network. User stations may use CDMA, FDMA, TDMA or other multiple-access techniques to obtain one or more clear communication paths to base stations. Base stations may be placed at convenient locations or may themselves be mobile. User stations may make and break connections with base stations as the user station moves between service regions, or is otherwise more advantageously serviced by, base stations. User stations may direct requests to and receive information from an enhanced telephone services processor, so as to obtain enhanced telephone services within the telephone network. Base stations may be coupled to each other by means of a private exchange. telephone system or other small business telephone system (such as a PBX, Centrex, or key-type system) so as to couple user stations in calls outside the telephone network. User stations may also be coupled directly or indirectly to the telephone network on their own or by another

10 Claims, 7 Drawing Sheets

U.S. PATENT DOCUMENTS

| | | | |
|---|---|---|---|
| 3,978,436 | 8/1976 | Casanova et al. | 333/30 R |
| 4,021,898 | 5/1977 | Willis et al. | 29/25.35 |
| 4,051,448 | 9/1977 | Coussot | 333/30 R |
| 4,100,498 | 7/1978 | Alsup et al. | 328/14 |
| 4,131,484 | 12/1978 | Caruso et al. | 134/1 |
| 4,163,944 | 8/1979 | Chambers et al. | 325/446 |
| 4,189,677 | 2/1980 | Cooper et al. | 325/321 |
| 4,217,563 | 8/1980 | Vale | 333/150 |
| 4,222,115 | 9/1980 | Cooper et al. | 375/1 |
| 4,247,942 | 1/1981 | Hauer | 375/25 |
| 4,285,060 | 8/1981 | Cobb et al. | 375/1 |
| 4,301,530 | 11/1981 | Gutleber | 370/18 |
| 4,314,393 | 2/1982 | Wakatsuki et al. | 29/25.35 |
| 4,355,411 | 10/1982 | Reudink et al. | 455/33 |
| 4,418,393 | 11/1983 | Zachiele | 364/724 |
| 4,418,425 | 11/1983 | Fennel et al. | 455/27 |
| 4,425,642 | 1/1984 | Moses et al. | 370/76 |
| 4,425,661 | 1/1984 | Moses et al. | 375/1 |
| 4,432,089 | 2/1984 | Wurzburg et al. | 370/110.1 |
| 4,445,256 | 5/1984 | Huguenin et al. | 29/25.35 |
| 4,455,651 | 6/1984 | Baran | 370/104 |
| 4,456,793 | 6/1984 | Baker et al. | 179/99 R |
| 4,479,226 | 10/1984 | Prabhu et al. | 375/1 |
| 4,484,028 | 11/1984 | Kelley et al. | 179/2 DP |
| 4,517,679 | 5/1985 | Clark et al. | 375/37 |
| 4,525,835 | 1/1985 | Vance et al. | 378/29 |
| 4,550,414 | 10/1985 | Guinon et al. | 375/1 |
| 4,554,668 | 11/1985 | Deman et al. | 375/1 |
| 4,561,089 | 12/1985 | Rouse et al. | 370/18 |
| 4,562,370 | 12/1985 | Dach | 310/312 |
| 4,563,774 | 1/1986 | Gloge et al. | 455/607 |
| 4,567,588 | 1/1986 | Jerrim | 370/18 |
| 4,569,062 | 2/1986 | Dellande et al. | 375/117 |
| 4,587,662 | 5/1986 | Langewellpott | 375/1 |
| 4,601,047 | 7/1986 | Horwitz et al. | 375/2.2 |
| 4,606,039 | 8/1986 | Nicolas et al. | 375/1 |
| 4,612,637 | 9/1986 | Davis et al. | 370/95 |
| 4,621,365 | 11/1986 | Chiu | 375/1 |
| 4,622,854 | 11/1986 | Locke et al. | 73/703 |
| 4,641,317 | 2/1987 | Fullerton | 375/1 |
| 4,642,505 | 2/1987 | Arvantis | 310/312 |
| 4,647,863 | 3/1987 | Skudera et al. | 329/112 |
| 4,649,549 | 3/1987 | Halpern et al. | 380/32 |
| 4,653,069 | 3/1987 | Roeder | 380/31 |
| 4,660,164 | 4/1987 | Leibowitz | 364/728 |
| 4,672,254 | 6/1987 | Dolat et al. | 310/313 R |
| 4,672,658 | 6/1987 | Kauehrad et al. | 375/1 X |
| 4,675,863 | 6/1987 | Paneth et al. | 370/50 |
| 4,680,785 | 7/1987 | Akiyama | 379/57 |
| 4,691,326 | 9/1987 | Tauchiya | 375/1 |
| 4,701,904 | 10/1987 | Darcie | 370/3 |
| 4,703,474 | 10/1987 | Foschini et al. | 370/18 |
| 4,707,839 | 11/1987 | Andren et al. | 375/1 |
| 4,718,080 | 1/1988 | Serrano et al. | 379/59 |
| 4,724,435 | 2/1988 | Moses et al. | 340/870.130 |
| 4,742,512 | 5/1988 | Akashi et al. | 370/96 |
| 4,745,378 | 5/1988 | Niitsuma et al. | 333/196 |
| 4,754,453 | 6/1988 | Eizenhofer | 370/95 |
| 4,754,473 | 6/1988 | Edwards | 379/58 |
| 4,759,034 | 7/1988 | Nagazumi | 375/1 |
| 4,759,078 | 7/1988 | Schiller | 455/49 |
| 4,765,753 | 8/1988 | Schmidt | 370/18 |
| 4,769,812 | 9/1988 | Shimizu | 370/67 |
| 4,774,715 | 9/1988 | Messenger | 375/1 |
| 4,787,093 | 11/1988 | Rorden | 375/23 |
| 4,800,885 | 1/1989 | Johnson | 128/633 |
| 4,804,938 | 2/1989 | Rouse et al. | 340/310 A |
| 4,805,208 | 2/1989 | Schwartz | 379/93 |
| 4,807,222 | 2/1989 | Amitay | 370/85 |
| 4,813,057 | 3/1989 | Fullerton | 375/37 |
| 4,815,106 | 3/1989 | Propp et al. | 375/36 |
| 4,817,089 | 3/1989 | Paneth et al. | 370/95 |
| 4,833,702 | 5/1989 | Shitara et al. | 379/60 |
| 4,837,786 | 6/1989 | Gurantz et al. | 370/20 |
| 4,837,802 | 6/1989 | Higashiyama et al. | 379/62 |
| 4,860,307 | 8/1989 | Nakayama | 375/1 |
| 4,866,732 | 9/1989 | Carey et al. | 375/1 |
| 4,878,238 | 10/1989 | Rash et al. | 379/62 |
| 4,893,327 | 1/1990 | Stern et al. | 379/59 |
| 4,894,842 | 1/1990 | Brockhoven et al. | 375/1 |
| 4,901,307 | 2/1990 | Gilhousen et al. | 370/18 |
| 4,905,221 | 2/1990 | Ichiyoshi | 375/1 X |
| 4,912,705 | 3/1990 | Paneth et al. | 370/95.1 |
| 4,918,689 | 4/1990 | Hui | 370/85.9 |
| 4,918,690 | 4/1990 | Markkula et al. | 370/94 |
| 4,943,973 | 7/1990 | Werner | 375/1 |
| 4,965,759 | 10/1990 | Uchida et al. | 364/604 |
| 4,979,170 | 12/1990 | Gilhousen et al. | 370/104.1 |
| 4,979,186 | 12/1990 | Fullerton | 375/23 |
| 4,984,247 | 1/1991 | Kaufmann et al. | 375/1 |
| 4,995,083 | 2/1991 | Baker et al. | 380/23 |
| 5,005,183 | 4/1991 | Carey et al. | 375/1 |
| 5,008,953 | 4/1991 | Dahlin et al. | 455/33 |
| 5,016,255 | 5/1991 | Dixon et al. | 375/1 |
| 5,018,165 | 5/1991 | Sohner et al. | 375/1 |
| 5,022,024 | 6/1991 | Paneth et al. | 370/50 |
| 5,022,046 | 6/1991 | Morrow | 375/1 |
| 5,022,047 | 6/1991 | Dixon et al. | 375/1 |
| 5,023,887 | 6/1991 | Takeuchi et al. | 375/1 |
| 5,025,452 | 6/1991 | Sohner et al. | 375/1 |
| 5,042,050 | 8/1991 | Owen | 375/1 |
| 5,056,109 | 10/1991 | Gilhousen et al. | 375/1 |
| 5,073,899 | 12/1991 | Collier et al. | 375/1 |
| 5,073,900 | 12/1991 | Mallinkdrodt | 375/1 |
| 5,093,840 | 3/1992 | Schilling | 375/1 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,119,375 | 6/1992 | Paneth et al. | 370/95.1 |
| 5,121,391 | 6/1992 | Paneth et al. | 370/95.1 |
| 5,150,377 | 9/1992 | Vannucci | 375/1 |
| 5,166,929 | 11/1992 | Lo | 370/85.3 |
| 5,177,765 | 1/1993 | Holland et al. | 375/1 |
| 5,177,766 | 1/1993 | Holland et al. | 375/1 |
| 5,185,762 | 2/1993 | Schilling | 375/1 |
| 5,193,101 | 3/1993 | McDonald et al. | 375/1 |
| 5,218,618 | 6/1993 | Sagey | 375/1 |
| 5,224,120 | 6/1993 | Schilling | 375/1 |
| 5,228,053 | 7/1993 | Miller et al. | 375/1 |
| 5,231,646 | 7/1993 | Health et al. | 375/1 |
| 5,239,572 | 8/1993 | Saegusa et al. | 379/61 |
| 5,263,045 | 11/1993 | Schilling | 375/1 |
| 5,265,119 | 11/1993 | Gilhousen et al. | 375/1 |
| 5,267,262 | 11/1993 | Wheatley | 375/1 |
| 5,274,665 | 12/1993 | Schilling | 375/1 |
| 5,280,472 | 1/1994 | Gilhousen et al. | 375/1 |
| 5,285,469 | 2/1994 | Vanderpool et al. | 375/1 |
| 5,289,497 | 2/1994 | Jacobson et al. | 375/1 |
| 5,299,226 | 3/1994 | Schilling | 375/1 |
| 5,351,269 | 9/1994 | Schilling | 375/1 |
| 5,402,413 | 3/1995 | Dixon | 370/18 |

OTHER PUBLICATIONS

Payne Freret et al., *Applications of Spread Spectrum Radio to Wireless Terminal Communications,* Hewlett–Packard Laboratories, IEEE 1980, pp. 69.7.1–69.7.4.

Payne Freret, *Wireless Terminal Communications Using Spread–Spectrum Radio,* Hewlett–Packard Laboratories, IEEE 1980, pp. 244–247.

M. Kavehrad and P. J. McLane, *Performance of Low–Complexity Channel Coding and Diversity for Spread Spectrum*

*in Indoor, Wireless Communication,* AT&T Technical Journal, vol. 64, No. 8, Oct. 1985, U.S.A.

Kavehrad, M. and McLane, P. J., *Spread Spectrum for Indoor Digital Radio,* IEEE Communications Magazine, Jun. 1987, vol. 25, No. 5, pp. 32–40.

J. H. Collins & P. M. Grant, *The Role of Surface Acoustic Wave Technology in Communication Systems,* Ultrasonics, Mar. 1972, vol. 10, No. 2, pp. 59–71.

Manfred G. Unkauf, *Surface Wave Devices in Spread Spectrum Systems,* Surface Wave Filters (Wiley 1977), pp. 477–509.

Dixon, Robert C., *Spread Spectrum Systems,* (J. Wiley & Sons, 2d Ed. 1984).

SPREAD SPECTRUM WIRELESS TELEPHONE SYSTEM

CROSS-REFERENCE TO RELATED APPLICATION

This application is a divisional application of application Ser. No. 07/712,239, filed Jun. 7, 1991, in the name of the same inventor with the same title, and now issued as U.S. Pat. No. 5,285,469, which is a continuation-in-part of application Ser. No. 07/709,712 (Lyon & Lyon Docket No. 194/135), filed Jun. 3, 1991, now abandoned, in the name of the same inventor with the same title, hereby incorporated by reference as if fully set forth herein.

BACKGROUND OF THE INVENTION

1. Field of the Invention

This invention relates to a spread spectrum wireless telephone system.

2. Description of Related Art

Access to telephone networks, may commonly occur via one of two general mechanisms, termed "private access" and "public access". As used herein, "private access" means access by means of dedicated circuits (and includes business telephones through PBX, Centrex, and key-type systems, and home telephones), while "public access" means access by means of common communication channels (and includes cellular telephones and payphones). Interconnection to a public switched telephone network (PSTN) for both private access and public access may make use of cable, fiber optic, wire, or radio frequency links, or other methods of communication known in the art. Many telephone networks, have a large number of telephones which are hardwired into the network and which have private access to the network from fixed locations.

One problem which has arisen in the art is the desire of mobile persons to have convenient and inexpensive access to telephone networks. These persons generally have a choice between locating a private-access business or home telephone, or a public-access payphone, which can be inconvenient, and using cellular telephone service, which can be expensive. Accordingly, it would be advantageous to provide a relatively convenient and inexpensive system which allows public access to telephone networks.

Moreover, public access to telephone networks is subject to a number of problems, due in part to the public nature of the communication channel. Such communication may be subject to eavesdropping and other security risks, and may also be subject to unpredictable loss, noise, interference, and even active jamming. Many of these problems are ameliorated by, spread-spectrum radio communication, in which transmitted signals are spread across a bandwidth which is wider than the bandwidth of the signal. Spread-spectrum communication may also be used in conjunction with CDMA, FDMA, TDMA, and other multiplexing techniques, and thus may offer advantages in a switching network.

One method of public access to telephone networks is shown in U.S. Pat. No. 4,878,238. While the system shown therein may achieve the goal of public access to a telephone network, it is subject to the drawback that it is not able to achieve the advantages of spread-spectrum communication. Moreover, the system shown therein has little or no ability to handoff user stations from one base station to another when conditions warrant. It would be advantageous to allow public access to the telephone network with relatively inexpensive user stations and which achieve this and other advantages of spread-spectrum communication.

Some aspects of the art of spread spectrum wireless communication are shown in U.S. Pat. No. 5,016,255 (issued May 14, 1991) and U.S. Pat. No. 5,022,047 (issued June 4, 1991), and in the following copending applications: Ser. No. 07/682,050, filed Apr. 8, 1991, in the name of inventor Robert C. Dixon, titled "THREE-CELL WIRELESS COMMUNICATION SYSTEM", and Ser. No. 07/600,772, filed Oct. 23, 1990, in the name of inventors Robert C. Dixon and Jeffrey S. Vanderpool, titled "METHOD AND APPARATUS FOR ESTABLISHING SPREAD SPECTRUM COMMUNICATIONS". Each of these patents and applications is hereby incorporated by reference as if fully set forth herein.

Another aspect of the problem of access to telephone networks is the desire for mobile persons to be able to contact each other, flor example, when these persons are closely located. Access by each such person to a telephone network would allow for them to contact each other, but it might place excess burden on the telephone network and might result in unwarranted delays in making such contacts. Accordingly, it would be advantageous to provide a relatively convenient and inexpensive system which allows contact between multiple user stations which have access (either private or public) to telephone networks.

One method of wireless contact between a plurality of user stations is shown in U.S. Pat. No. 4,672,658. While the system shown therein may achieve the goal of operating a wireless PBX, it is subject to the drawback that it may require complex and relatively expensive user stations, and may not be smoothly integrated into a system for access to telephone networks. Accordingly, it would be advantageous to provide private exchange telephone systems (including PBX, Centrex, or key-type systems) which can be smoothly integrated in a system for providing access (either private or public) to telephone networks with relatively inexpensive user stations.

Another development in the art of telephone networks is the "intelligent network", used herein to mean a telephone. network in which enhanced telephone network services are performed by an independent processor, rather than by a local switch or a local switching processor. In an intelligent network, a telephone caller can communicate directly with the independent processor, for controlling enhanced telephone network features. Examples of these enhanced features are call routing and call screening.

Some of these enhanced features are useful for rerouting messages from one telephone to another, while others are useful for caching messages while a person is not available at a particular telephone. Both of these purposes are quite suited to mobile persons who frequently access telephone networks. Moreover, enhanced features add to the value of having a telephone and thus encourage mobile persons to use mobile telephones. Accordingly, it would be advantageous if enhanced features were available to mobile telephones.

SUMMARY OF THE INVENTION

The invention provides a system for accessing a telephone system, in which a set of user stations are matched with a set of base stations for connection to a telephone network. Base stations may be coupled directly or indirectly to the telephone network and may be capable of initiating or receiving calls on the telephone network. User stations may be mobile, may comprise a spread-spectrum transmitter or receiver and may be capable of dynamic connection to selected base stations. A plurality of base stations may be coupled to a private exchange telephone system for coupling user stations in calls outside the telephone network.

In embodiments of the invention, user stations may use CDMA, FDMA, TDMA or other multiple-access techniques to obtain one or more clear communication paths to base stations. Base stations may be placed at convenient locations or may themselves be mobile. User stations may make and break connections with base stations as the user station moves between service regions, or is otherwise more advantageously serviced by, base stations. User stations may direct requests to and receive information from an enhanced telephone services processor, so as to obtain enhanced telephone services within the telephone network. Base 2 8 stations may be coupled to each other by means of a private exchange telephone system or other small business telephone system (such as a PBX, Centrex, or key-type system) so as to couple user stations in calls outside the telephone network. User stations may also be coupled directly or indirectly to the telephone network on their own or by another access path, such as narrowband or spread-spectrum cellular telephone circuits.

The embodiments described herein may operate using a time division multiple access technique, and may comprise means for establishing and maintaining handshaking and communications between a master unit (e.g., a base station) and a plurality of node units (e.g., user stations). In one embodiment, a total of N time slots, constituting a time frame, are assumed available for communicating and/or initializing communications with the master unit by using time division multiple access. Of a plurality of N node units, K node units, where K<N, are assumed to have established 2K communication links with a master unit, using up to 2K different spectrum spreading codes to generate up to K different spread spectrum signals to transmit from the master unit to K node units, and K different spread spectrum signals to transmit from K node units to the master unit. A time slot for each of the K linked node units is provided for transmitting and receiving in each of the first K time slots. While the system capacity allows N node units to establish and maintain simultaneous communications with a single master unit, the number of total node units, X, which may access the master unit is not limited to N, but may be much greater.

DESCRIPTION OF THE PREFERRED EMBODIMENT

Figure 1:
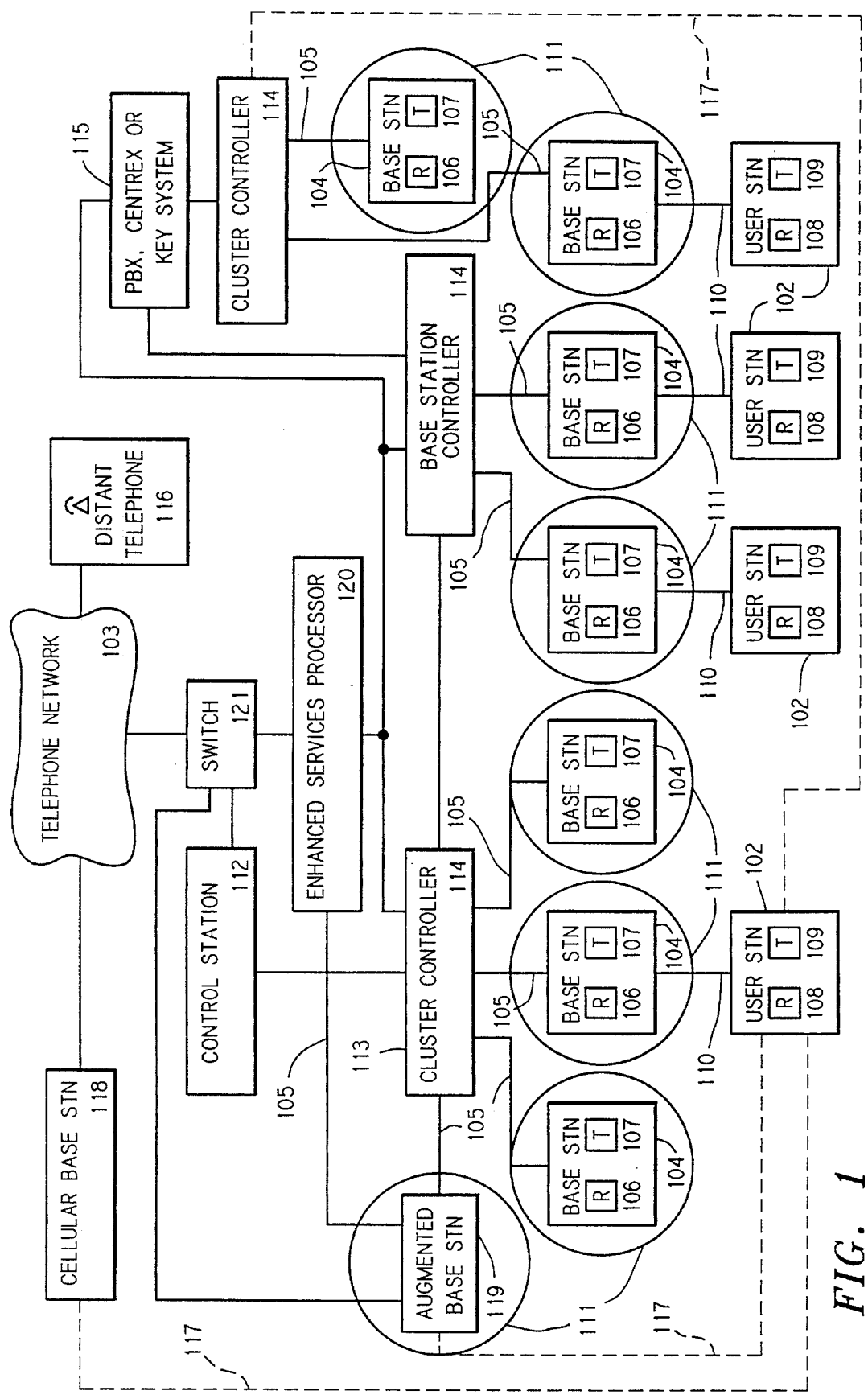
FIG. 1 shows a wireless communication system coupled to a telephone network.

FIG. 1 shows a wireless communication system coupled to a telephone network.

A wireless communication system i for communication between a user station 2 and a telephone network 3 includes a base station 4, which is coupled to the telephone network 103 by means of a telephone link 5. The base stations 104 each generally comprise a base station receiver 6 and a base station transmitter 7, and the user stations 102 each generally comprise a user station receiver 8 and a user station transmitter 9 (although some base stations 104 or some user stations 102 may be receive-only or transmit-only, e.g. for emergency signals or locationing information), and may be coupled by a spread-spectrum communication link 10.

In a preferred embodiment, the telephone link 105 may comprise a private access link, such as cable, fiber optics, or wire, or a laser or microwave link. However, the telephone link 105 may alternatively comprise a public access link, such as a radio channel, a cellular telephone link, or other means. Moreover, the telephone link 105 may alternatively comprise an indirect communication link, such as by means of a switching processor or a different telephone network. It would be clear to one of ordinary skill in the art, after perusal of the specification, drawings and claims herein, that all of these alternative techniques, as well as other and further techniques, would be workable, and are within the scope and spirit of the invention.

The communication link 110 between base stations 104 and user stations 102 may make use of known spread-spectrum techniques, such as those disclosed in patents and applications incorporated by reference herein. These generally provide for distinguishing the base stations 104 and the user stations 102 with logical identifiers such as frequency bands, spread-spectrum codes, timeslots, or station identifiers. The base stations 104 and the user stations 102 may operate on a plurality of spreadspectrum codes, thus performing CDMA, on a plurality of (possibly overlapping) frequency bands, thus performing FDMA, on a plurality of timeslots, thus performing TDMA, with a plurality of station identifiers to be included in messages, or with other multiplexing techniques.

Locations near base stations 104 may generally define a set of cells 11, as in a cellular system. However, there is no particular requirement that the cells 111 will form a convenient repeating pattern or that they will be of uniform size or traffic density. In fact, base stations 104 may be placed at convenient locations, ormay themselves be mobile.

If the cells 111 local to base stations 104 overlap, such as when base stations 104 are closely located or when base stations 104 are mobile, techniques for allocating logical identifiers (such as frequency bands, spread-spectrum codes, timeslots, or station identifiers), between base stations 104 and user stations 102, within and among cells 111, may use methods such as those disclosed in patents and applications incorporated by reference herein. In a preferred embodiment, base stations 104 may have logical identifiers allocated by a control station 12 coupled to the telephone network 10B or to a base station 104.

Spread-spectrum communication between base stations 104 and user stations 102 may comprise handoff of user stations 102 from an old base station 104 to a new base station 104. A user station 102 may be handed-off from one base station 104 to another for one of several reasons. For example, the user station 102 may have moved, or may have better radio contact with the new base station 104, such as if the radio environment changes. For example, a large object may move between the user station 102 and the old base station 104). Alternatively,. if base stations 104 are located in different parts of the telephone network 103 or controlled by different oversight hardware, such as different area code or telephone exchange, it may be advantageous to handoff a user station 102 from one base station 104 to another for the purpose of using a new area code or telephone exchange.

If handoff occurs while a call on the telephone network 103 is in progress, the old base station 104 or the new base station 104 will direct the telephone network 103 to reroute the call to use the new base station 104, by a message to a rerouting processor 13. The rerouting processor 113 could be a cluster controller 14 for directly controlling a set of base stations 104, a private exchange telephone system 15 such as a PBX, Centrex, or key-type system (or the cluster controller 114 and the private exchange telephone system 115 operating in conjunction), a local switch, a local switching processor, or the control station 112.

Spread-spectrum communication between base stations 104 and user stations 102 may comprise protocol for initiating communication between base stations 104 and user stations 102 like that disclosed in patents and applications incorporated by reference herein. After a base station 104 and a user station 102 initiate communication, the user station 102 may communicate with a distant telephone 16 (which is not necessarily physically distant) on the telephone network 103 by initiating or receiving calls.

In a preferred embodiment, a user station 102 may initiate a call by initiating communication with a base station 104 and directing that base station 104 to initiate a call in the telephone network 103. The base station 104 may direct the telephone net.work 103 to initiate the call and to make a connection to the distant telephone 116. Communication between the user station 102 and the distant telephone 116 may be coupled from the user station 102 to the base station 104 to the telephone network 103 to the distant telephone 116, and on the reverse path.

Similarly, a user station 102 may receive a call by the base station 104 initiating communication with the user station 102 and directing the user station 102 to receive the call. The base station 104 may receive the call and make the connection from the distant telephone 116. Communication between the distant telephone 116 and the user station 102 may be coupled from the distant telephone 116 to the telephone network 103 to the base station 104 to the user station 102, and on the reverse path.

Spread-spectrum communication between base stations 104 and user stations 102 may comprise CDMA, FDMA, TDMA, and other multiplexing techniques for communication between base stations 104 and user stations 102 without interference, and may also comprise allocation of frequencies, spread-spectrum codes and other communication resources in a region by the control station 112 such as those techniques disclosed in patents and applications incorporated by reference herein.

User stations 102 may also be coupled to the telephone network 103 by an independent access path 17, such as by cellular wireless telephone communication using a cellular base station 18. In a preferred embodiment, user stations 102 may have multiple communication channels (e.g., multiple codes, frequencies, or timeslots), and thus be capable of coupling to a plurality of different base stations 104. An augmented base station 19 may additionally perform the function of the cellular base station 118 in a cellular wireless telephone network, so that a user station 102 which can make an independent access path to the augmented base station 119 may have direct access to the telephone network 103 like a cellular telephone.

Figure 2:
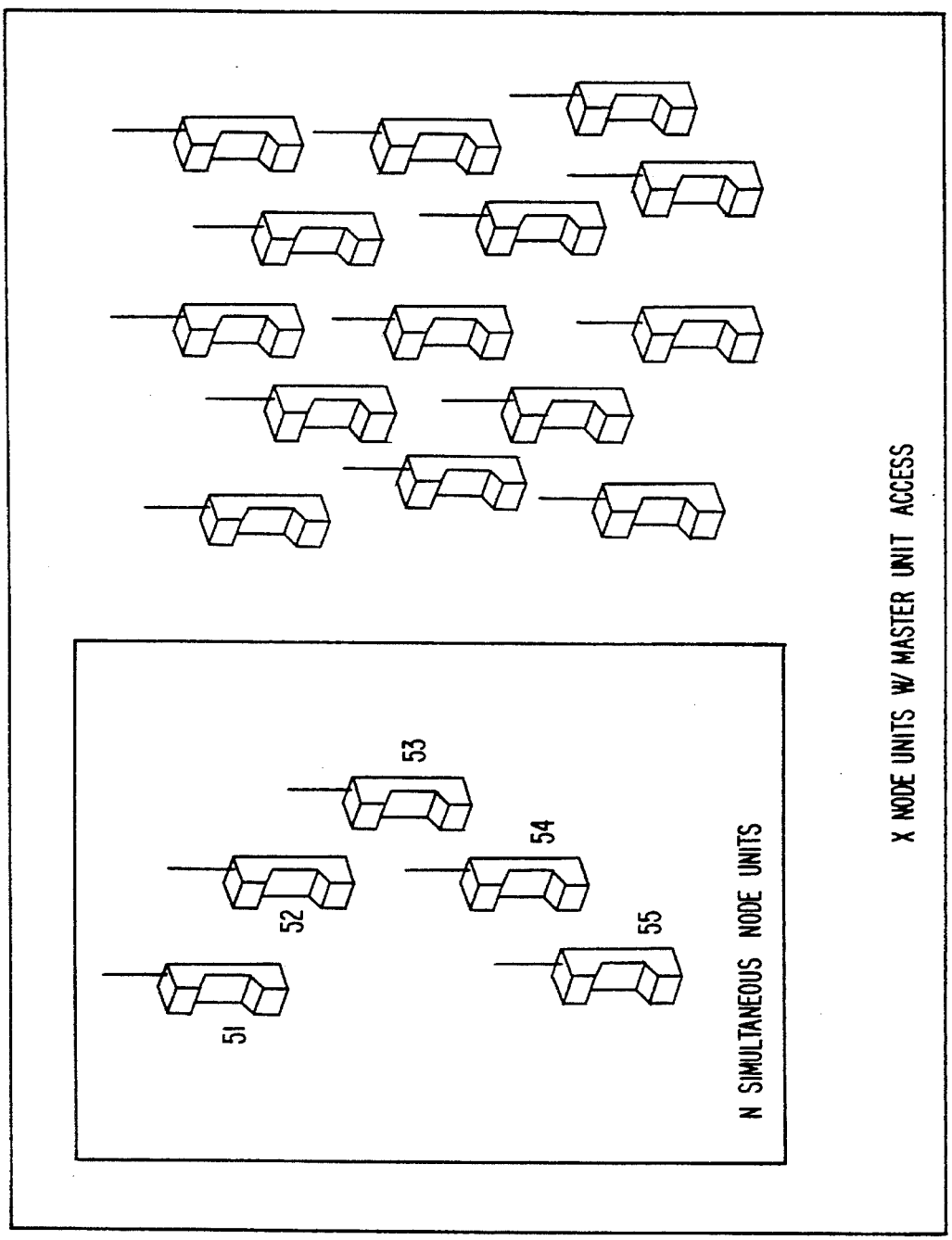
FIG. 2 is a diagram illustrating a master unit with a plurality of remote units.
Figure 2:
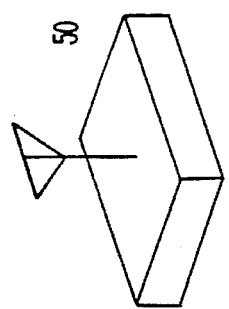

FIG. 2 is a diagram illustrating a particular arrangment for establishing communications between a master unit and a plurality of node units (e.g., N node units). The master unit 50 may be a base station, PBX, file server or other central controlling device serving as the center of a star network, and the node units may be any type of computer, communications, telephone, video or other data device serving as a node point in the star network. While the system capacity allows N node units to establish simultaneous communications with a single master unit, the number, X, of node units that may access the master unit is not limited to N node units, but may be much larger than N.

As illustratively shown in FIG. 2, a master unit 50 is shown with a plurality of N node units 51, 52, 53, 54, 55, where N=5, and a plurality of X node units 56, of which the plurality of N node units is a subset. Of the plurality of N node units 51, 52, 53, 54, 55, three node units (K=3), are assumed to already have established communications channels with the master unit 50 using up to six different spectrum spreading chip codes to generate up to six different spread spectrum signals.

A particular node unit and master unit use two of up to six spectrum spreading chip codes during communications. A first of the two spectrum spreading chip codes is used while communicating from the master unit to the particular node unit. A second of the two spectrum spreading chip codes is used while communicating from the particular node unit to the master unit. The spectrum spreading chip codes may be embodied as a pseudorandom sequence, and the spectrum spreading chip codes typically modulate information data which may be embodied as a data bit sequence, as is well known in the art.

Figure 6:
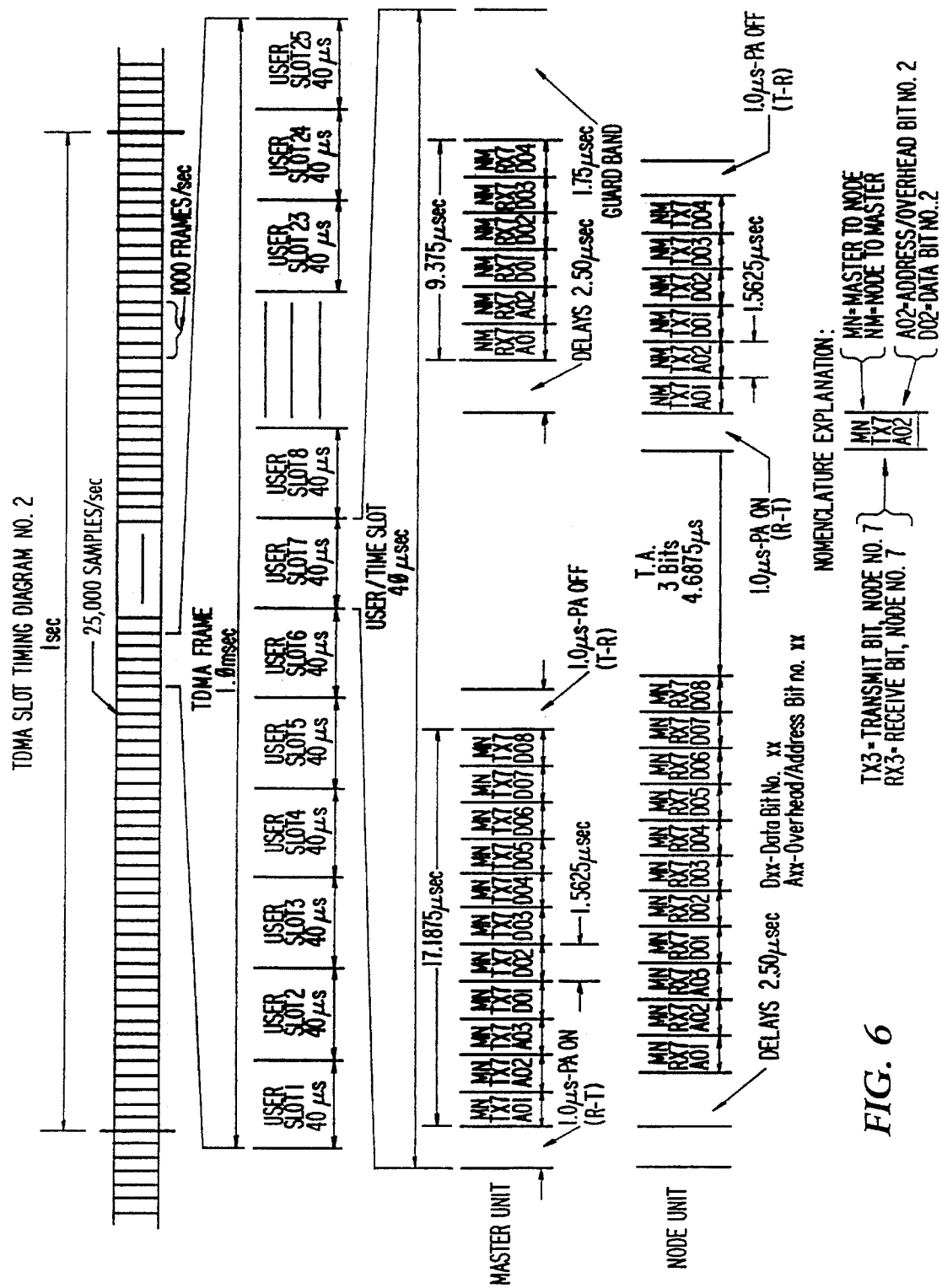
FIG. 6 is a diagram illustrating another embodiment of a multiple access system timing structure.

An exemplary time frame for time division multiple access is shown in FIG. 6. In the embodiment of FIG. 6, a total of five time slots (N=5), which constitute a time frame, are assumed available for communicating with the master unit 50 by use of time division multiple access. Each of the three node units 51, 52, 53, communicates with the master unit 50 in a time slot, which may be the first three of five time slots. Alternatively, each of the three node units may communicate with the master unit 50 in three time slots which have any predetermined order. Additionally, a (K+1)th time slot, which by way of example is the fourth time slot (K+1=4), may occupy, or "float" to, any open time slot within the time frame of the two unused time slots, and may change time slots as the number, K, of node units which have established communications links with the master unit, changes. A node unit, which of the five node units is the fourth node unit, desires to establish communications with, or access the master unit 50.

As used herein, the term transmitting and/or receiving in a time slot may include transmitting and/or receiving in a plurality of time slots in a slot position within a frame and/or from frame to frame. Transmitting and/or receiving in a particular time slot also does not limit a time slot to a particular slot position within a frame.

One embodiment involves the steps of transmitting in a (K+1)th time slot from the master unit 50, a master-initialization spread spectrum signal, CSn1. The master-initialization spread spectrum signal uses a master-common-signalling chip code which is known and stored in all the node units able to access the master unit. All of the node units have means responsive to the master-initialization spread spectrum signal, for correlating with the master-common-signalling chip code of the master unit 50. The correlating means may embodied as a surface acoustic wave device (SAW), digital device, or any other device which can perform the required function. The master-common-signalling chip code may, but is not required to, modulate information data embodied as a data bit sequence or data symbol sequence. The information data may include indexing, addressing, or other data pertinent to the (K+1)th time slot. The entire chip sequence of the master-common-signalling chip code may be transmitted per data bit or data symbol during the (K+1)th time slot from the master unit.

In response to receiving the master-initialization spread spectrum signal, CSn1, at the (K+1)th node unit, the method and apparatus include transmitting from the (K+1)th node unit in the (K+1)th time slot a first node-initialization spread spectrum signal, CSm1. The first node-initialization spread 28 spectrum signal may, but is not required to, retransmit the master-common-signalling chip code which was transmitted from the master unit during the (K+1)th time slot. Alternatively, the first node-initialization spread spectrum signal, CSm1, may use a node-common-signalling chip code which can be received by all master units that the (K+1)th node unit may access. The first node-initialization spread spectrum, CSm1, signal additionally may be modulated by information data, such as the (K+1)th node unit's identification code, or an acknowledgment ("ack") to signal the master unit a node unit desires to establish communications with the master unit, allowing the master to proceed with the exchange of identification and communication information between the master unit and the (K+1)th node unit. The entire chip sequence of the master-common-signalling chip code or node-common-signalling chip code may modulate-each bit, or symbol, of the information data, i.e., the node unit's identification code, using spread spectrum modulation.

The master unit 50 receives the first node-initialization spread spectrum signal, CSm1, from the (K+1)th node unit in the (K+1)th time slot, and transmits in the (K+1)th time slot a master-identification spread spectrum signal, CSn2. The master-identification spread spectrum signal uses a masteridentification code which is common to all X node units. The master-identification code is modulated by the master-commonsignalling chip code or node common-signalling chip code to produce the master-identification spread spectrum signal.

The master-identification code may be unique to the (K+1)th master unit slot, and may be unique to a minimum of N master-identification codes available at the master unit 50. The master-identification code, which may be distinct from all other master-identification codes and node-identification codes, is used by the node unit for generating a master unit chip code for a spread spectrum signal used to communicate with the master unit 50. The master-unit chip code is generated from an algorithm processing the master-identification code, which may include, for example, a one-to-one relationship for setting taps on a set of shift registers.

In response to receiving the master-identification spread spectrum signal, CSn2, from the master unit 50 in the (K+1)th time slot, the (K+1)th node unit transmits in the (K+1)th time slot a (K+i) node-identification code to the master unit using a second node-initialization spread spectrum signal, CSm2. As described.previously for the first node-initialization spread spectrum signal, the second node-initialization spread spectrum signal, CSm2, uses a master-common-signalling chip code, or a node-common-signalling chip code which is common to all master units to which the (K+1) node unit may access for modulating the node-identification code. The (K+1) node-identification code may have a high degree of uniqueness compared with node unit identification codes by which the plurality of other node units may access the master unit.

The master unit 50 receives the (K+1)th nodeidentification code, and establishes the master-unit-to-(K+1)th-node-unit communication channel by transmitting in the (K+1)th time slot a master-unit-(K+1)th-slot communication spread spectrum signal, CMNK+1. A (K+1)-node-unit chip code for the master unit-(K+I)th slot communication spread spectrum signal may be generated from the (K+1)th node unit identification code.

In response to receiving the (K+1)th master-identification code, the (K+1)th node unit establishes the (K+1)th node-unit-to-master unit communication channel by transmitting in the (K+1)th time slot a (K+1)th node-unit-communication spread spectrum signal, CNMK+1. A master-unit chip code for the (K+1)th node unit communication spread spectrum signal is generated from the (K+1)th master-identification code.

In the explanatory embodiment discussed herein, the master unit may operate such that it does not transmit in a time slot except to.send a plurality of K master unit slot communication spread spectrum signals, CMN1 to CMNK, in K time slots, to K node units which have established communications links with the master unit, plus a master-initialization spread spectrum signal, CSn1, in the case of a search for a new node unit trying to access the master unit, or a master unit slot identification signal, CSn2, in the case of a node unit being in the process of accessing a master unit, leaving N-K-1 time slots unused. If the master unit is transmitting a masteridentification spread spectrum signal, CSn2, in the (K+1)th time slot (the (K+1)th node unit is in the process of accessing the master unit), it then may transmit a master-initialization spread spectrum signal, CSn1, in the (K+2)th time slot, in order to allow the (K+2)th node unit to access the master unit through the same method.

If all node units utilize the same receive spread spectrum code (CMNk+1), the master unit does not necessarily have to derive a spectrum spreading code from the (K+1)th node unit's identification code, but may rather, upon determination by the master unit the (K+1)th node unit's identification code is valid, transmit a spread spectrum communication signal common to all node units able to access the master unit and rely on address bits within the time slot to maintain synchronization of the node units with the master unit.

If a plurality of up to N-K node units tries to access the master unit sequentially in time, with the period between access attempts being greater than or equal to the time frame period, upon reception of the master-initialization spread spectrum signal, CSn1, each node unit of the plurality of N-K node units will access the time slot immediately available following its initiation of the access attempt. When the first (K+1)th node unit has accessed the master unit (master unit (K+1)th slot and (K+1)th node unit identification signals are being transmitted in the (K+1)th time slot), the master unit may wait to transmit the (K+2)th master unit slot identification signal until the (K+1)th slot is occupied with master unit-to-(K+1)th node unit and/or (K+1)th node unit-to-master unit communication signals.

If a plurality of up to N-K node units tries to access the master unit instantaneously (the time period between node unit access attempts being less than the frame period), upon reception of the master-initialization spread spectrum signal, CSn1, each node unit of this plurality of node units will transmit a first node initialization spread spectrum signal, CSm1, within the same time slot, thus jamming at least one of the node unit initialization signals, CSm, at the master unit. If the master unit does not receive a valid node-initialization spread spectrum signal, CSm, or identification code from a node unit during the time slot, it may cease to transmit any signal in that time slot for a predetermined period of time, or it may transmit a "jammed signal alarm" code through the master-identification spread spectrum signal, CSn2. When a lack of response or a jammed signal alarm code from the master unit is encountered, the node units which tried to access the master unit instantaneously, of the plurality, N-K, of node units, may then initiate a node unit internal "wait" state, whose period may be derived from each node unit's identification code. After the wait state period, the plurality of node units which failed to access the master unit may attempt to access it again. Since wait states may be highly unique to each node unit, it is unlikely that the same plurality of node units will jam each other again.

If all N time slots are being used for communication or initialization functions by N node units, then the master-initialization spread spectrum signal, CSn1, is not transmitted by the master unit, and no new node units of the plurality of X - N node units may access the master unit until a time slot opens up through one or more of the N node units abandoning communications with the master unit.

As an alternative architecture to the present embodiment, the master unit may operate such that the Nth time slot may be held in reserve to transmit a "busy" alarm to the plurality of N-K node units having not established communications with the master unit such that it informs them that no further access is available at that master unit, thereby allowing only N-1 node units to access the master unit.

Figure 3A:
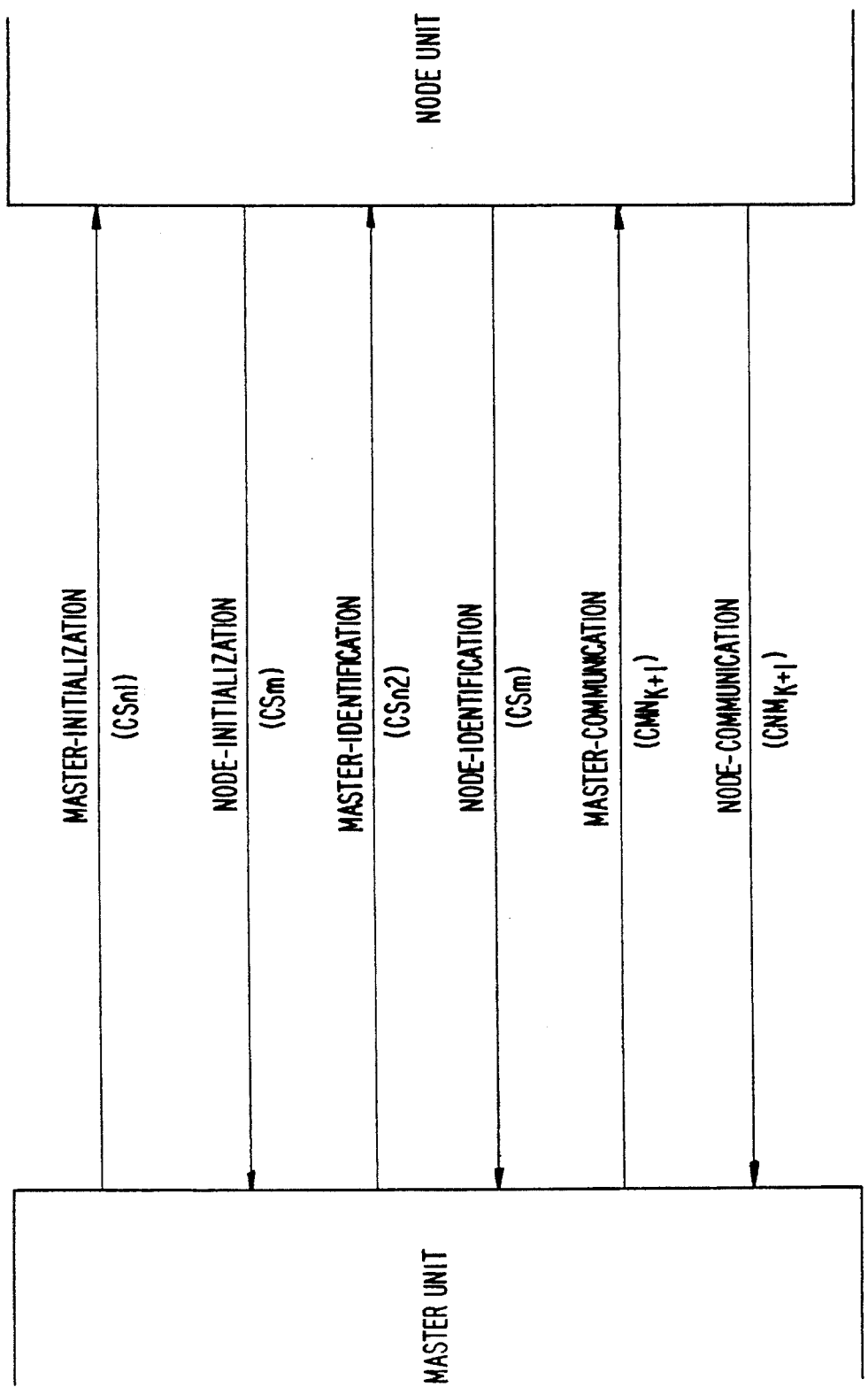
FIG. 3A and 3B are diagrams illustrating a particular protocol in accordance with one or more aspects of the present invention.
Figure 3B:
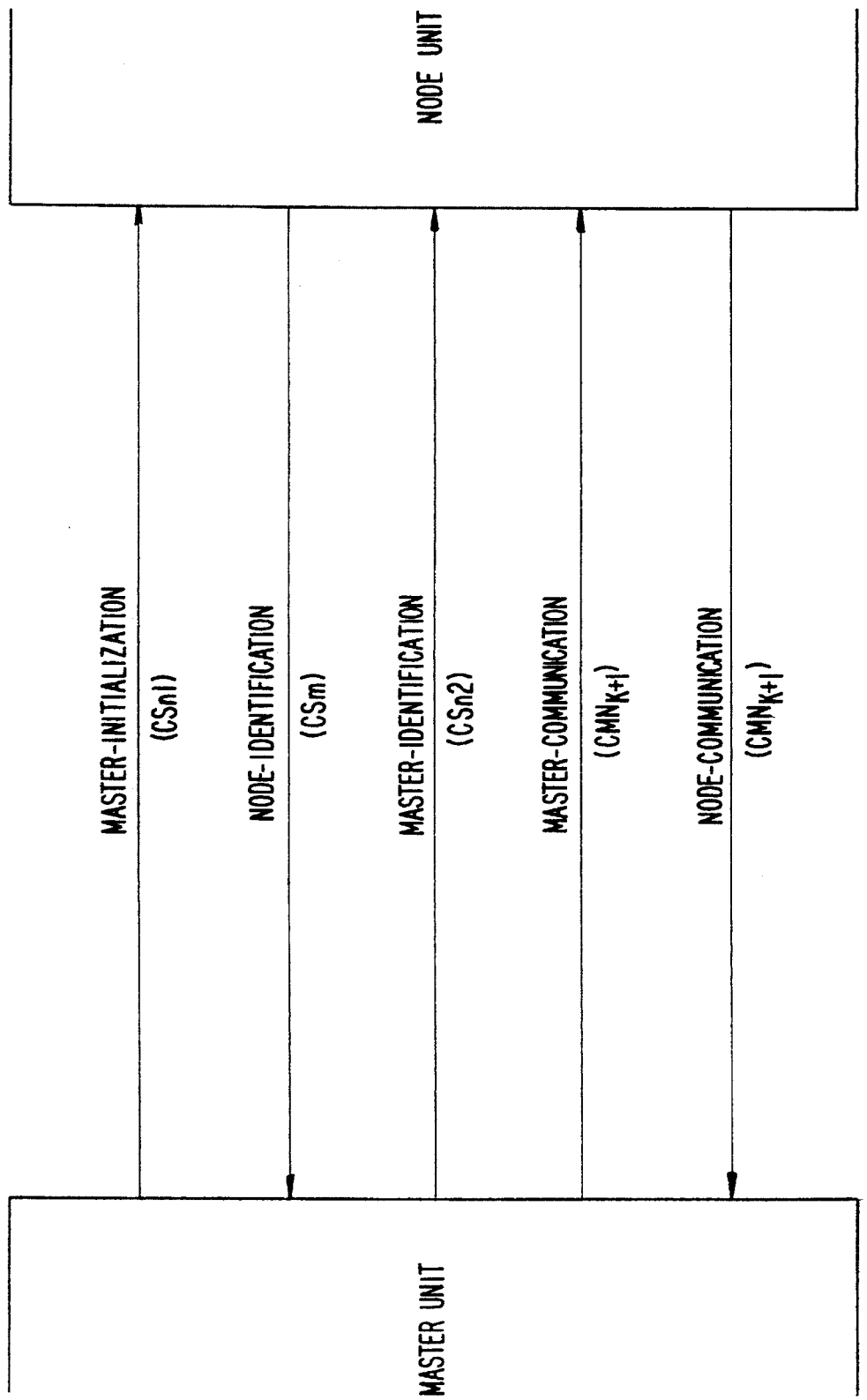

FIGS. 3A and 3B illustrate the foregoing protocol of the present invention.

FIG. 3A illustrates the case where the node unit responds to the master-initialization signal with the node-initialization signal, which may be a simple acknowledgment ("ack"), to advise the master unit of the (K+1)th node unit's presence and desire to establish communications. The master and node units then proceed to exchange identification and communication signals as detailed above.

FIG. 3B illustrates the case where the node unit responds to the master-initialization signal with the node-identification signal, decreasing the time and steps necessary to establish communications between the master unit and the (K+1)th node unit. The master and node units then proceed to exchange identification and communication signals as detailed above.

Figure 4:
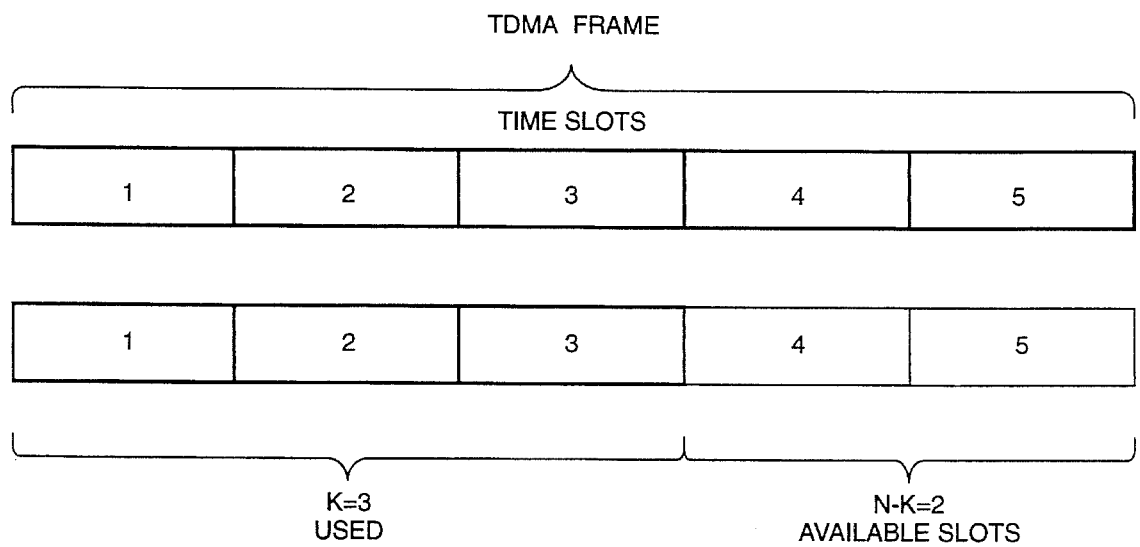
FIG. 4 is a diagram illustrating a time frame divided into time slots.

The time division multiple access frame and time slots of the present invention are illustratively shown in FIG. 4. There are N time slots, with N=5, available for N node units to communicate with the master unit, with K=3 time slots already being used by the first K node units which are communicating with the master unit. During any one or all of the available N-K=2 time slots, the master unit transmits a master-initialization spread spectrum signal, CSn1, common to the set of X node units that may access the master unit, of which the N=5 node units is a subset. Since all node units which may access the master unit recognize the first master-initialization spread spectrum signal, CSn1, the 4th node unit trying to access the master unit will know that this time slot is available for communicating. In response to receiving the master-initialization spread spectrum signal, CSn1, in the 4th time slot, the 4th node unit may transmit in the 4th time slot to the master unit its identification code or a simple acknowledgment ("ACK") through a first node-initialization spread spectrum signal, CSm1, common to all master units it may access, but distinct from the master-initialization spread spectrum signal, CSn1.

In response to receiving the first node-initialization spread spectrum signal, CSm1, in the 4th time slot from the 4th node unit, the master unit transmits its 4th master-identification code, which may be distinct from all other master and node unit identification codes, with a master-identification spread spectrum signal, CSn2, common to the plurality of node units that may access the master unit and distinct from the master-initialization spread spectrum signal, CSn1, and the first node-initialization spread spectrum signal CSm1. In response to receiving the 4th master-identification spread spectrum signal, CSn2, the 4th node unit may transmit in the 4th time slot its identification code through the second node-initialization spread spectrum signal, CSm2. In response to receiving the 4th node-identification code, the master unit derives a master unit spectrum spreading communication code for the 4th slot from the 4th node-identification code, and uses it to generate a master unit 4th slot communication spread spectrum signal, CMN4. The 4th master unit slot communication signal, CMN4, is then used for all transmissions from the master unit to the 4th node unit.

If all node units utilize the same receive spread spectrum code (CMN4), the master unit does not necessarily have to derive a spectrum spreading code from the 4th node unit's identification code, but may rather, upon determination by the master unit that the 4th node unit's identification code is valid, transmit a spread spectrum communication signal common to all node units able to access the master and rely on address bits within the time slot to maintain synchronization of the four node units with the master unit.

In response to receiving the master-identification code for the 4th time slot, the 4th node unit derives a 4th node unit spectrum spreading communication code from the master-identification code, and uses it to generate a 4th node unit communication spread spectrum signal, CNM4. The 4th node unit communication signal, CNM4, is then used for all transmissions from the 4th node unit to the master unit.

Figure 5:
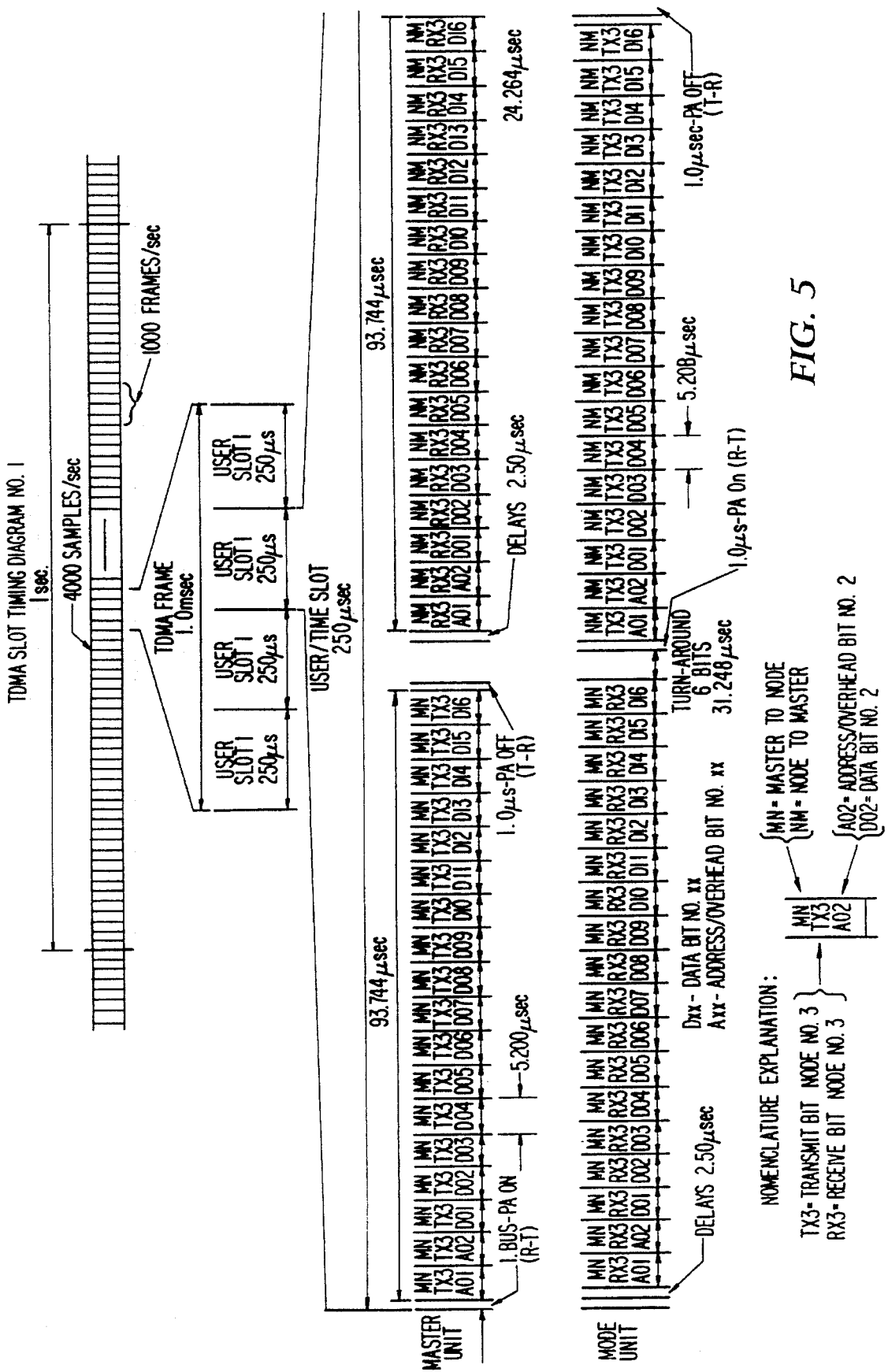
FIG. 5 is a diagram illustrating a multiple access system timing structure.

Particular embodiments illustrating time division multiple access are depicted in FIGS. 5 and 6.

In a particular embodiment, as illustrated in FIG. 5, there may be 4000 samples per second, divided into 1000 frames of four time slots of 250 microseconds each, allowing N=4 users to use one timeBlot 1000 times per second. The master unit transmits eighteen bits (two overhead/addressing, sixteen data) in each time slot it uses, yielding 16 kbps throughput from the master unit to each node unit per slot, which may be applied as compressed digital voice for a cordless telephone application. In initialization or identification modes, the eighteen bits may be used differently. Node units, which may be embodied as handsets as illustrated in FIG. 2, transmit eighteen bits per time slot only in response to receiving a spread spectrum initialization, identification, or communication signal from the master unit. The master unit transmission frame comprises four time slots, and is configured such that it does not transmit in a time slot except to send a spread spectrum communication signal to K users who are on line, plus an initialization (in the case of a search for a new node unit trying to access the master unit) or identification (in the case of a new node unit in the process of accessing a master unit) signal, leaving N-K-1 i time slots open. If the master unit is transmitting a master-identification spread spectrum signal in the (K+1)th time slot (i.e. the (K+1)th node unit is accessing the system), it then may transmit a master-initialization spread spectrum signal in the (K+2)th time slot, in order to allow the (K+2)th node unit to access the master unit. Thus, if two node units are present, then the master unit transmits in the first through second time slots the communication spread spectrum signals pertaining to the first through second nodes, and in the third time slot an initialization spread spectrum signal common to all node units that may access the master unit, which may be distinct from all communication-and identification spread spectrum signals.

If, with N=4 and K=2 node units, a plurality of up to 2 node units try to access the master unit sequentially in time, with the period between access attempts being greater than or equal to the slot period, or 250 microseconds, upon reception of the master-initialization spread spectrum signal, CSn1, the third and fourth node units will access the third and fourth time slots, respectively, immediately available in the first time frame following their respective initiations of the access attempt. When the third node unit has accessed the system (master unit slot and third node unit identification signals are being transmitted in the third time slot), the master unit may wait to transmit the fourth master unit slot identification signal until the third slot is occupied with master unit-to-3rd node unit and/or third node unit-to-master unit communication signals. If, with N=4 and K=2 node units, a plurality of up to two node units tries to access the master unit instantaneously (the time period between node unit access attempts being less than the slot period, or 250 microseconds), upon reception of the master-initialization spread spectrum signal, CSn1, in the third time slot, the third and fourth node units will transmit a first node-initialization spread spectrum signal, CSm1, within the third time slot, thus jamming at least one of the first node14 initialization signals, CSm1, at the master unit. If the master unit does not receive a valid initialization signal, CSm, or identification code from a node unit during the third slot, it may cease to transmit any signal in the third time slot for a predeterminedperiod of time, or it may transmit a "jammed signal alarm" code through the master-identification spread spectrum signal, CSn2. When a lack of response or a jammed signal alarm code from the master unit is encountered, the third and fourth node units may then initiate a node unit internal "wait" state, whose period may be derived from each node unit's identification code. After the wait state period, the third and fourth node units may attempt to access it again. Since wait states may be highly unique to each node unit, it is unlikely that the third and fourth node will units jam each other again. If all four time slots are being used for communication or initialization functions by four node units, then the initialization spread spectrum signal, CSn1, is not transmitted by the master unit, and no new node units of the plurality of X-4 node units may access the master unit.

With N=4 and K=2, the master unit may function with the initialization, identification, and communication procedures detailed above, but may be configured to transmit the master-initialization spread spectrum signal, CSn1, in the vacant the third and fourth time slots. If the master unit does transmit the third and fourth vacant time slots, node units three and four may access the master unit in the third and fourth time slots, respectively or randomly. Therefore, the third node unit trying to access the master unit would access the first time slot immediately available after its initiation of the access attempt, instead of waiting for the third time slot to occur in the next frame.

Thus, if two users are present, the master unit transmits in the first through second time slots the master unit communication spread spectrum signals, CMN1 through CMN2, pertaining to the first through second node units, and in the third through fourth time slots a master initialization spread spectrum signal, CSn1, common to the plurality, X, of node units that may access the master unit, which may be distinct from all master or node unit communication and identification spread spectrum signals. If two node units try to access the master unit sequentially in time, with the period between access attempts being greater than or equal to the slot period of 250 microseconds, upon reception of the master-initialization spread spectrum signal, CSn1, each node unit will access the open time slot available immediately following its initiation of the access attempt. When the third node unit has accessed the master unit (master unit slot and third node unit identification signals are being transmitted in the third time slot), the master unit may wait to transmit the fourth master unit slot identification signal until the third slot is occupied with master unit-to-4th node unit and/or third node unit-to-master unit communication signals.

If a plurality of up to two node units tries to access the master unit instantaneously (the time period between node unit access attempts being less than the slot period, or 250 micro-seconds), upon reception of the master-initialization spread spectrum signal, CSn1, the third and fourth node units will transmit a first node-initialization spread spectrum signal, CSM1, or second node-initialization spread spectrum signal, CSm2, within the same time slot, thus jamming at least one of the node-initialization spread spectrum signal or node-identification spread spectrum signal, CSm, at the master unit. If the master unit does not receive a valid node-initialization spread spectrum signal or node-identification spread spectrum signal, CSm1, or identification code from a node unit during the time slot, it may cease to transmit any signal in that time slot for a predetermined period of time, or it may transmit a "jammed signal alarm" code through the master-identification spread spectrum signal, CSn2. When a lack of response or a jammed signal alarm code from the master unit is encountered, the third and fourth node units may initiate a node unit internal "wait" state, whose period may be derived from each node unit's identification code. After the wait state period, the third and fourth node units may attempt to access it again. Since wait states may be highly unique to each node unit, it is unlikely that the third and fourth node units will jam each other again.

The timing structure illustrated in FIG. 5 for the communication mode serves as example only, and is not intended to be restrictive in or to the current embodiment of the invention. The number of address, overhead, and data bits, turn-around, delay, and transmitter turn-on/off times, bit periods, samples, frames and/or slots per second may be different according to the operational mode the system is in (i.e. initialization, identification, communication) as well as the specific implementation of the invention.

In another embodiment, as illustrated in FIG. 6, the system operates as in the first embodiment (i.e, node units transmit only in response to a master unit transmission of the node unit's code, the K and N-K slots operating the same, etc.) except that the master and node transmit M-ary data bits per code sequence. In this embodiment, there may be 25000 samples per second, divided into 1000 frames per second of 25 time slots of 40 microseconds each, allowing N=25 users to use one time slot 1000 times per second. (See FIG. 6.) The master unit transmits binary data bits (6 overhead/addressing, 16 data) in quarternary operation, where each code sequence transmission represents two binary data bits, or four binary states, which may be represented as:

| Code Sequence Number | Data Bits |
|---|---|
| 0 | 00 |
| 1 | 01 |
| 2 | 10 |
| 3 | 11 |

The master-node link therefore yields 16 kbps throughput per slot. In initialization or identification nodes, the data structure of the transmission may be different in order for the handshaking operations to be completed. Node units, which may be embodied as handsets as illustrated in FIG. 1, transmit 22 binary data bits in each time slot (6 overhead/ addressing, 16 data) in 16-ary operation, wherein each code sequence transmission represents four binary data bits, or sixteen binary states, which may be represented as:

| Code Sequence Number | Data Bits |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

The node-master unit link therefore yields 16 kbps throughput per slot. In initialization or identification nodes, the data structure of the transmission may be different in order for the handshaking operations to be completed.

The timing structure illustrated in FIG. 6 for the communication mode serves as example only, and is not intended to be restrictive in or the current embodiment of the invention. The number of address, overhead, and data bits, turnaround, delay, and transmitter turn-on/off times, bit period, m-ary operations, samples, frames and/or slots per second may be different according to the operational mode the system is in (i.e. initialization, identification, communication) as well as the specific implementation of the invention.

The M-ary approach has several potential advantages. One is more node units per master unit for the same bandwidth. Another is lower receiver complexity in the node units, which allows for a more practical implementation in handheld, battery powered devices such as telephones. For example, in the current embodiment, the node receiver could store fewer spread spectrum codes, reducing its complexity, relying on the master unit to contain more spread spectrum codes and complexity.

Figure 7:
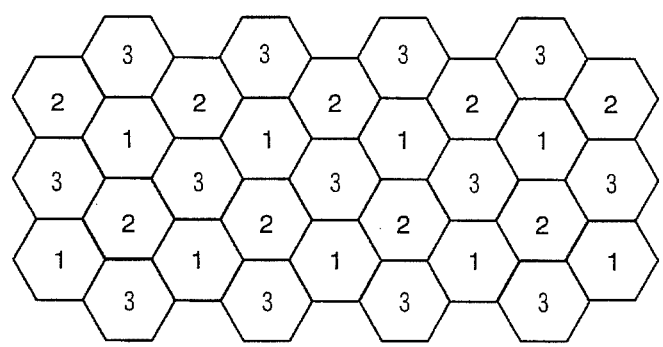
FIG. 7 is a diagram illustrating an FDMA three frequency communication network.

Certain embodiments of the present invention allows for multiple base stations to be situated closely together through the use of frequency offsets in a three frequency zone architecture, as illustrated in FIG. 7. By relying on code division multiplexing, frequency re-use can be employed in every other zone. This requires that node units be able to scan the three frequencies to determine which is used by the master unit whose zone the node is in.

In another embodiment, a fixed, or Fth, time slot, such as the 1st or Nth slots of the plurality of N time slots in a time frame, serves as the access slot. The second method and apparatus comprises the steps of transmitting in the Fth time slot from the master unit the master-initialization spread spectrum signal, CSn1, common to all node units. The Fth time slot may occupy a fixed time slot within the time frame of the NK unused time slots, and does not change slots as the number, K, of node units which have established communications links with the master unit, changes.

In response to receiving the master-initialization spread spectrum signal, CSn1, in the Fth time slot, the (K+1)th node unit transmits in the Fth time slot a (K+1)th node-initialization spread spectrum signal, CSm, which may be he same as CSn1, common to all master units that the (K+1)th node unit may access, which may contain the (K+1)th node unit's identification code.

The master unit receives the node-initialization spread spectrum signal, CSm, in the Fth time slot from the (K+1)th node unit, and transmits in the Fth time slot a master-identification spread spectrum signal, CSn2, which may be distinct from spread spectrum signal CSn1 but common to all X node units, containing the master unit's (K+1)th slot identification code, which may include information directing the (K+1)th node unit as to which time slot and spectrum spreading code to use for communication from the (K+1)th node unit to the master unit.

In response to receiving the master-identification spread spectrum signal, CSn2, the (K+1)th node unit may transmit in the Fth time slot the (K+1)th node-initialization spread spectrum signal, CSm, common to all master units that it may access, which may contain its (K+1)th node unit identification code, which may have a high degree of uniqueness to the plurality of the N-1 other node units.

The master unit receives the (K+1)th node unit's identification code from the (K+1)th node unit in the Fth time slot via the node-initialization spread spectrum signal, CSm, common to all master units accessible by the (K+1)th node unit, and transmits in the (K+1)th time slot a master unit (K+1)th slot communication spread spectrum signal, CMNk+1, generated from a spectrum spreading code derived from the (K+1)th node unit's identification code.

In response to receiving the (K+1)th master unit identification code from the master unit in the Fth time slot via the master-identification spread spectrum signal, CSn2, common to all X node units, the (K+1)th node unit transmits in the (K+1)th time slot a (K+1)th node unit communication spread spectrum signal, CNMk+i, generated from a spectrum spreading code derived from the (K+1)th master-identification code.

As an alternative architecture of this embodiment, the (K+1)th node unit may transmit the (K+1)th node communication spread spectrum signal in the (K+1)th time in slot in response to receiving the master unit (K+1)th slot communication signal in the (K+1)th time slot. In this case, the master-identification spread spectrum signal transmitted in the Fth time slot would not necessarily contain information detailing which time slot of the N-K time slots to use for communication transmissions.

In another embodiment, the master unit may operate such that it does not transmit in a time slot except to send a plurality of K master unit slot communication spread spectrum signals, CMN1 to CMNK, to K node units which have established communications links with the master unit, plus a master-initialization spread spectrum signal, CSn1, in the case of a search for a new node unit trying to access the master unit, or a master-identification spread spectrum signal, CSn2, in the case of a node unit being in the process of accessing a master unit, in the Fth time slot, leaving N-K-1 time slots unused. If the master unit is transmitting a master-identification spread spectrum signal, CSn2, in the Fth time slot (assuming the (K+1)th node unit is in the process of accessing the system), it then may transmit a master initialization spread spectrum signal, CSn1, in one of the N-K-1 unused time slots, in order to allow the (K+2)th node unit to access the master unit.

If a plurality of up to N-K node units tries to access the master unit sequentially in time, with the period between access attempts being greater than or equal to the frame period, upon reception of the master-initialization spread spectrum signal, CSn1, each node unit of the plurality of N-K node units will access the (K+1)th time slot through the Fth time slot immediately available following its initiation of the access attempt. When the first (K+1)th node unit has accessed the system (assuming the master-identification and (K+1)th node-identification spread spectrum signals are being transmitted in the Fth time slot), the master unit may wait to transmit the (K+2)th master-identification spread spectrum signal until the (K+1)th slot is occupied with master unit-to-(K+1)th node unit and/or (K+1)th node unit-to-master unit communication signals.

If a plurality of up to N-K node units tries to access the master unit instantaneously (the time period between node unit access attempts being less than the frame period), upon reception of the master-initialization spread spectrum signal, CSn1, in the Fth time slot, each node unit of this plurality of node units will transmit a node-initialization spread spectrum signal, CSm, within the same time slot, thus jamming at least one of the node-initialization spread spectrum signals, CSm, at the master unit. If the master unit does not receive a valid initialization signal, CSm, or identification code from a node unit during the time slot, it may cease to transmit any signal in the Fth time slot for a predetermined period of time, or it may transmit a "jammed signal alarm" code through the masteridentification spread spectrum signal, CSn2. When a lack of response or a jammed signal alarm code from the master unit is encountered, the node units which tried to access the master unit instantaneously, of the plurality, N-K, of node units, may then initiate a node unit internal "wait" state, whose period may be derived from each node unit's identification code. After the wait state period, the plurality of node units which failed to access the master unit may attempt to access it again. Since wait states may be highly unique to each node unit, it is unlikely that the same plurality of node units will jam each other again.

If all N-1 time slots are being used for communication or initialization functions by N-1 node units, then the master-initialization spread spectrum signal, CSn1, is not transmitted. The master unit may operate such that the Fth time slot may a "busy" alarm to the plurality of N-K node units having not established communications with the master unit such that it informs them that no further access is available at that master unit, thereby allowing only N-1 node units to access the master unit.

In another embodiment of the present invention, the master unit may function with the initialization, identification, and communication protocols as set forth in the first and second embodiments, but may be configured to transmit the master-initialization spread spectrum signal, CSn1, in a plurality of vacant (N-K) time slots, simultaneously. If the master unit does transmit in a plurality of vacant (N-K) time slots, node units (K+1), (K+2), (K+3), ..., (K+(N-K)) (or N) may access the master unit in the (K+1)th, (K+2)th, (K+3)th, ..., (K+(N-K))th (or Nth) time slots, respectively or randomly. Therefore, the (K+1)th node unit trying to access the master unit would access the first time slot immediately available after its initiation of the access attempt, instead of waiting for the (K+1)th or Fth time slot to occur in the next frame.

Thus, if K users are present, the master unit transmits in the 1st through Kth time slots the master unit communication spread spectrum signals, CMN1 through CMNK, pertaining to the 1st through Kth node units, and in the (K+1)th through Nth time slots a master initialization spread spectrum signal, CSn1, common to the plurality, X, of node units that may access the master unit, which may be distinct from all master or node unit communication and identification spread spectrum signals.

If a plurality of up to N-K node units tries to access the master unit sequentially in time, with the period between access attempts being greater than or equal to the slot period, upon reception of the master-initialization spread spectrum signal, CSn1, each node unit will access the open time slot available immediately following its initiation of the access attempt. When the first (K+1)th node unit has accessed the master unit (master unit slot and (K+1)th node unit identification signals are being transmitted in the (K+1)th time slot), the master unit may wait to transmit the (K+2)th through Nth master unit slot identification signals until the (K+1)th slot is occupied with master unit-to-(K+1)th node unit and/or (K+1)th node unit-to-master unit communication signals.

If a plurality of up to N-K node units tries to access the master unit instantaneously (the time period between node unit access attempts being less than the slot period), upon reception of the master-initialization spread spectrum signal, CSn1, each node unit of this plurality of node units will transmit a node-initialization spread spectrum signal, CSm, within the same time slot, thus jamming at least one of the node-initialization spread spectrum signals, CSm, at the master unit. If the master unit does not receive a valid node-initialization spread spectrum signal, CSm, or identification code from a node unit during the time slot, it may cease to transmit any signal in that time slot for a predetermined period of time, or it may transmit a "jammed signal alarm" code through the master unit slot identification signal, CSn2. When a lack of response or a jammed signal alarm code from the master unit is encountered, the node units which tried to access the master unit instantaneously, of the plurality, N - K, of node units, may initiate a node unit internal "wait" state, whose period may be derived from each node unit's identification code. After the wait state period, the plurality of node units which failed to access the master unit may attempt to access it again. Since wait states may be highly unique to each node unit, it is unlikely that the same plurality of node units will jam each other again.

If all N time slots are being used for communication or initialization functions by N node units, then the initialization spread spectrum signal, CSn1, is not transmitted by the master unit, and no new node units of the plurality of X - N node units may access the master unit. The master unit may operate such that the Nth time slot may transmit a "busy" alarm to the plurality of N-K node units having not established communications with the master unit such that it informs them that no further access is available at that master unit, thereby allowing only N-1 node units to access the master unit.

An enhanced-services processor 20 coupled to the telephone network 103 may provide enhanced telephone services within the telephone network 103, as is well known in the art. After a base station 104 and a user station 102 initiate communication, the user station 102 may communicate with the enhanced-services processor 120 by initiating or receiving messages between the user station 102 and the enhanced-services processor 120, so as to obtain enhanced telephone services within the telephone network 103 just as if the user station 102 was an ordinary telephone on the telephone network 103.

Other and further details on the nature and operation of enhanced-services processors (also known as "intelligent network" processors or adjunct network processors) may be found in "ADVANCED INTELLIGENT NETWORK RELEASE 1 PROPOSAL" (Issue 1, November 1989), Document No. SR-NPL-001509; "ADVANCED INTELLIGENT NETWORK RELEASE 1 BASELINE ARCHITECTURE" (Issue 1, March 1990), Document No. SR-NPL-001555; "AMERITECH PUBLIC TELEPHONE MESSAGE DELIVERY SERVICE INTERFACE SPECIFICATIONS" (Issue 1, November 1989), Document No. AM-TR-MKT-000046; "INTELLIVIEW NETWORK MANAGEMENT SERVICE TERMINAL INTERFACE SPECIFICATION, BELL ATLANTIC", Document No. TR72511, all published by Bellcore. All of these documents are hereby incorporated by reference as if fully set forth herein.

A plurality of cluster controllers 114 and private exchange telephone systems 115 may be coupled to the enhanced-services processor 120. A plurality of enhanced-services processors 120 may also be coupled to one or more local switches 21 for coupling to the telephone network 103. Moreover, control stations 112 or augmented base stations 119 may be coupled to local switches 121, enhanced-services processors 120, cluster controllers 114 or base stations 104. The cluster controllers 114 may be coupled to each other for direct routing of calls outside the telephone network 103, e.g. by means of known routing methods. The cluster controllers 114 may also be coupled to the private exchange telephone system 115, which may perform routing among them.

In a preferred embodiment, user stations 102 may be coupled to each other in calls outside the telephone network 103. A first user station 102 may initiate a call by initiating communication with a first base station 104 and directing that first base station 104 to initiate a call with a second user station 102. The first base station 104 may route the call to a second base station 104, either directly by couplings between base stations 104 or by means of the private exchange telephone system 115. The second base station 104 may direct the second user station 102 (coupled to the second base station 104) to receive the call. Communication between the first user station 102 and the second user station 102 may be coupled from the first user station 102 to the first base station 104 to the private exchange telephone system 115 to the second base station 104 to the second user station 102, and on the reverse path.

In a preferred embodiment, if handoff of user stations 102 from an old base station 104 to a new base station 104 occurs while a call outside the telephone network 103 is in progress, the old base station 104 or the new base station 104 may direct the private exchange telephone system 115 to reroute the call to use the new base station 104.

Alternative Embodiments

While preferred embodiments are disclosed herein, many variations are possible which remain within the concept and scope of the invention, and these variations would become clear to one of ordinary skill in the art after perusal of the specification, drawings and claims herein.

I claim:

1. A wireless communication system, comprising
    a first base station coupled to a telephone network and having means for initiating a call on said telephone network and means for receiving a call on said telephone network,
    means for establishing a first communication path between a user station and said first base station, said first communication path comprising a first link supporting spread-spectrum communication,
    wherein said first communication path is completed between said first base station and said user station when said user station initiates or receives a call on said telephone network, and wherein said user station is capable of being handed-off from said first base station to a second base station,
    means for establishing a second communication path between said first base station and said user station over which said user station is capable of initiating or receiving a different call, said second communication path comprising a second link between said user station and an intermediary communication element coupled to said first base station, and
    means for transmitting a set of signals to be communicated between said base station and said user station by multiplexing said signals.

2. A system as in claim 1, wherein said intermediary communication element comprises a cellular base station.

3. A system as in claim 1, wherein said intermediary communication element comprises a cluster controller.

4. A system as in claim 16, wherein said second communication path further comprises a link from said intermediary communication element to a private exchange telephone system.

5. A system as in claim 1, wherein said intermediary communication element comprises an augmented base station.

6. A system as in claim 1, wherein a narrowband signal is transmitted over said second communication path.

7. A system as in claim 1, wherein said set of signals are multiplexed using different frequency bands.

8. A system as in claim 1, wherein said set of signals are multiplexed using different spread spectrum codes.

9. A system as in claim 1, wherein said set of sinals are multiplexed using different station identifiers.

10. A system as in claim 1, wherein said set of signals are multiplexed using different timeslots.

* * * * *